US006439336B2

(12) United States Patent
Noro et al.

(10) Patent No.: US 6,439,336 B2
(45) Date of Patent: Aug. 27, 2002

(54) ELECTRIC POWER STEERING APPARATUS

(75) Inventors: Yoshiki Noro; Yoshinobu Mukai, both of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/799,835

(22) Filed: Mar. 6, 2001

(30) Foreign Application Priority Data

Apr. 5, 2000 (JP) ........................................ 2000-103541

(51) Int. Cl.[7] ................................................ B62D 5/04
(52) U.S. Cl. ........................................ 180/404; 180/446
(58) Field of Search ............................. 180/404, 405, 180/406, 407, 443, 444, 446

(56) References Cited

U.S. PATENT DOCUMENTS 4,972,133 A * 11/1990 Hirota et al. ............... 180/404
5,027,276 A * 6/1991 Morishita et al. ........... 180/404
5,271,474 A * 12/1993 Nishimoto et al. .......... 180/404
5,720,361 A * 2/1998 Nishimoto et al. .......... 180/404
6,332,506 B1 * 12/2001 Kifuku ....................... 180/404

FOREIGN PATENT DOCUMENTS

JP    5-42705    10/1993

* cited by examiner

Primary Examiner—Kevin Hurley
(74) Attorney, Agent, or Firm—Merchant & Gould P.C.

(57) ABSTRACT

A controller for controlling the assist steering torque of an electric motor in an electric power steering apparatus has a relay failure detection unit for detecting ON failure which arises in a relay circuit provided between an electric motor driving circuit and a power supply; and a relay failure correction unit for decreasing the assist steering torque, at least the maximum value of the assist steering torque, of the electric motor based on a failure detection signal from the relay failure detection unit. Thereby, manual steering by a steering wheel with a heavier steering torque than the torque at the time of a normal mode becomes possible as deal at the time that ON failure arises in a relay circuit.

6 Claims, 6 Drawing Sheets

ELECTRIC POWER STEERING APPARATUS

FIELD OF THE INVENTION

This invention relates to an electric power steering apparatus for applying an assist steering torque to the steering system of a vehicle by an electric motor, and more particularly to an electric power steering apparatus to improve back-up measure at the time of ON failure in a relay circuit provided between a driving circuit of the electric motor and a power supply.

BACKGROUND OF THE INVENTION

In recent years, a so-called electric power steering apparatus has become more popular as the power steering apparatus of a vehicle. An electric power steering apparatus reduces the steering force required by a driver of the vehicle by applying an assist torque to the steering system with an electric motor during operation of the vehicle.

An electric power steering apparatus, basically, comprises a steering torque sensor for detecting the steering torque of the steering system generated by a steering wheel, a controller for outputting a control signal according to the direction and magnitude of a detection torque, and an electric motor driving circuit for driving the electric motor according to the control signal from the controller.

In the electric power steering apparatus, a relay circuit is provided between the electric motor driving circuit and a power supply. This relay circuit is configured such that ON/OFF of the relay circuit is available by the instruction of the controller and the relay circuit becomes OFF when the controller fails (See Japanese Utility Model publication No. H5-42705).

However, sometimes so-called ON failure arises in the relay circuit wherein the steering joints lock or stick together. In ON failure, the electric power steering apparatus performs a function to address the ON failure in a case where the electric motor driving circuit is in a normal mode. However, there may be a problem in a case where failure arises in the electric motor driving circuit when the ON failure occurs, for example when excess current is sent to the electric motor or there is a short circuit in the power supply circuit or the like failure in the electric motor driving circuit.

So, in a conventional electric power steering apparatus, occurrence of failure in the relay circuit is checked as an initial check at the time that the ignition switch turns ON. The function of the electric power steering apparatus is instantaneously stopped as the electric motor driving circuit enters the OFF state.

Once the function of the electric power steering apparatus is instantaneously stopped at the time ON failure of the relay circuit, manual steering torque of the steering wheel becomes extremely heavy due to a lack of the assist steering torque provided by the conventional electric power steering apparatus. In particular, great manual steering torque is required for a vehicle with a large load applied to a front shaft of the vehicle, and thereby manual steering by the steering wheel becomes difficult.

SUMMARY OF THE INVENTION

This invention has been made to address the above problems, and it is therefore the object of the invention to provide an electric power steering apparatus which is capable of manual steering by a steering wheel during ON failure in a relay circuit as a back-up measure. Another object of the invention is to provide an electric power steering apparatus which comprises:

(1) an electric motor for applying an assist steering torque to the steering system of a vehicle;
(2) an electric motor driving circuit for driving the electric motor;
(3) a steering torque sensor for detecting the steering torque of the steering system;
(4) a controller for outputting a control signal based on a detection signal of the steering torque sensor of the electric motor driving circuit to control an assist steering torque with the electric motor; and
(5) a relay circuit, which is capable of switching ON/OFF according to instructions of the controller, which is provided between the electric motor driving circuit and a power supply, wherein the controller includes
  (a) a relay failure detection unit for detecting ON failure in the relay circuit; and
  (b) a relay failure correction unit for decreasing the assist steering torque, at least the maximum value of the assist steering torque, of the electric motor based on the failure detection signal of the relay failure detection unit at the time of ON failure of the relay circuit.

In the electric power steering apparatus of the present invention, the relay circuit turns ON according to the instruction of the controller, and connects the electric motor driving circuit and the electric motor to a power supply. The steering torque sensor detects the steering torque of the steering system with operation of the steering wheel and outputs the control signal based on this steering torque to the electric motor driving circuit to control the assist steering torque applied to the steering system by the electric motor. When the relay failure detection unit detects ON failure of the relay circuit, the relay failure correction unit decreases the maximum value of the assist steering torque by the electric motor based on the failure detection signal. As a result of this, although the steering torque by the steering wheel becomes heavier than the steering torque at the time of normal mode, manual steering becomes possible even for a vehicle with a large load applied to the front shaft.

The steering torque of the steering wheel becomes gradually heavier for every restart of the vehicle after ON failure of the relay circuit in a case where the relay failure correction unit is configured so as to gradually increase the amount of the decreased assist steering torque according to the number of accumulation input times of the ON signal of an ignition switch after ON failure arises in the relay circuit in the electric power steering apparatus.

In the electric power steering apparatus of the present invention, the relay failure correction unit may be configured so as to multiply a signal value, the signal value being set with the controller, by a correction coefficient having a decimal value, which is less than one, to decrease the maximum value of the assist steering torque by the electric motor based on the detection signal of the steering torque sensor. The relay failure correction unit may be configured so as to decrease the maximum value of the assist steering torque within a limit of the maximum value of the signal value.

The above and other objects, features, and advantages of the invention will become more apparent from the following description when taken in conjunction with the accompanying drawings.

DESCRIPTION OF THE PREFERRED EMBODIMENT

Figure 1:
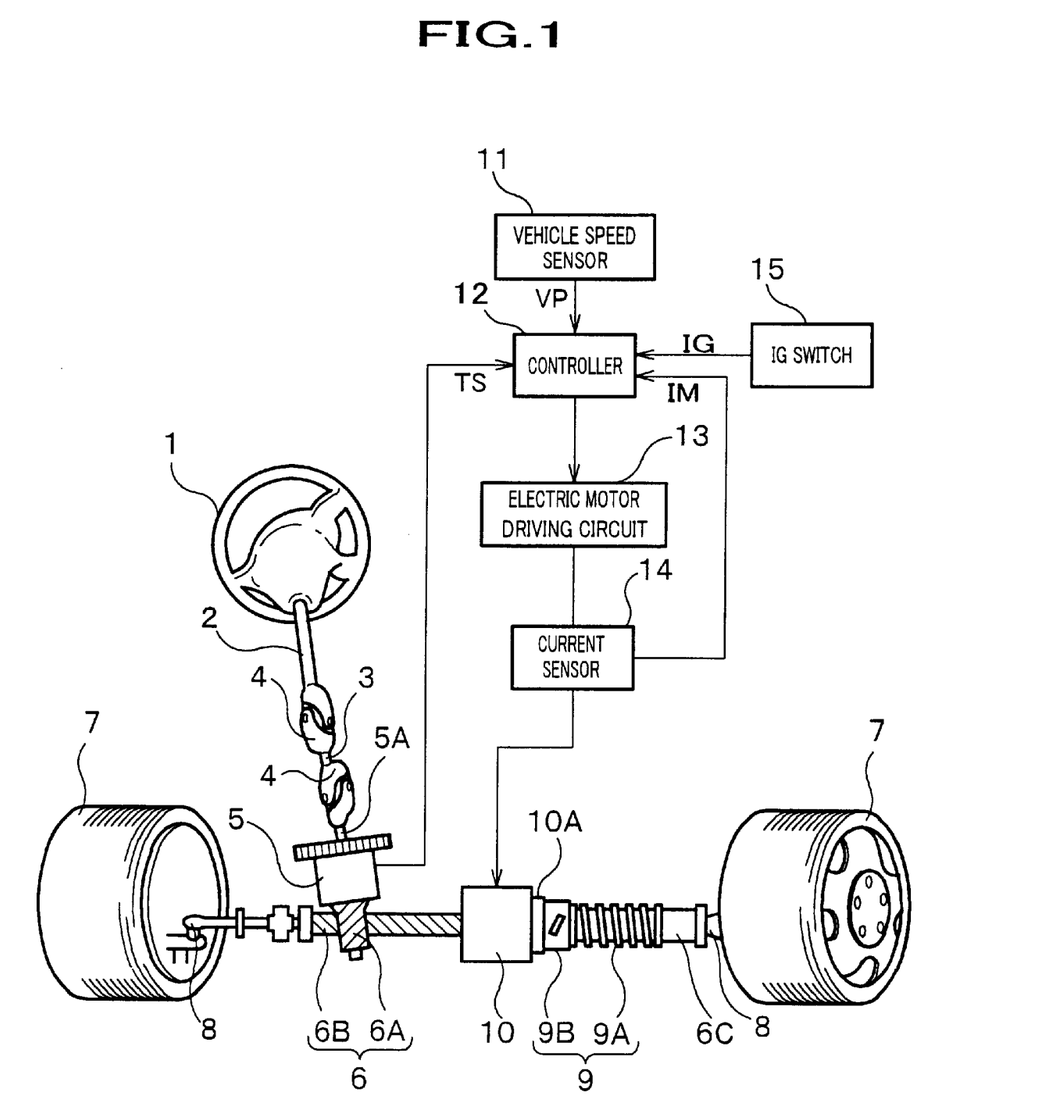
FIG. 1 is a configuration diagram of a steering system for an electric power steering apparatus according to one embodiment of the present invention.
Figure 2:
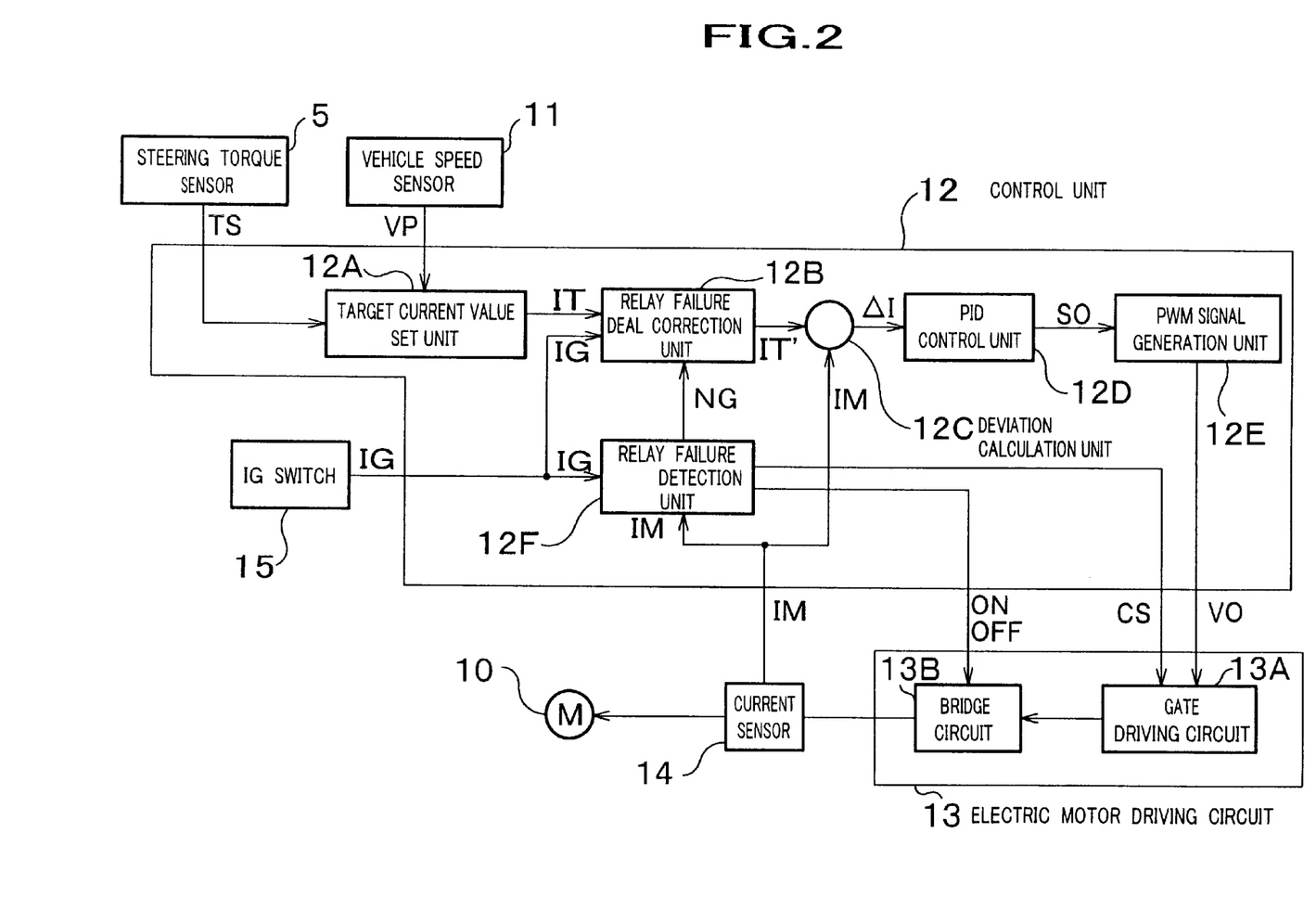
FIG. 2 is a block configuration diagram of the electric power steering apparatus.

One embodiment of an electric power steering apparatus according to the present invention will be described below referring to the drawings. FIG. 1 is a configuration diagram of a steering system to which an electric power steering apparatus is applied. FIG. 2 is a block diagram of an electric power steering apparatus.

The electric power steering apparatus and the steering system to which the electric power steering apparatus is applied is described by referring to FIG. 1. The steering system is a rack/pinion type steering system. A bottom end portion of steering shaft 2 is integrally connected to steering wheel 1 and coupled with input shaft 5A of steering torque sensor 5 via a pair of universal joints 4,4 connected mutually by coupling shaft 3. Pinion 6A of rack/pinion mechanism 6 is integrated with an output shaft of steering torque sensor 5.

Rack/pinion mechanism 6 includes a rack shaft 6C in which rack gear 6B is formed, the rack gear 6B being engaged with pinion 6A, and knuckle arms (not shown) extending to right and left front wheels 7,7 of the vehicle that are respectively coupled with both end portions of rack shaft 6C via tie rods 8,8. A ball screw portion 9A of ball screw mechanism 9 is formed in rack shaft 6C. A ball nut 9B engages ball screw portion 9A and is fixed to rotor 10A of electric motor 10. Electric motor 10 covers a circumference of rack shaft 6C which penetrates electric motor 10.

The electric power steering apparatus comprises a vehicle speed sensor 11 for detecting a number of speeds of the transmission output shaft (not shown), a controller 12 for inputting at least detection signals of vehicle speed sensor 11 and steering torque sensor 5, an electric motor driving circuit 13 for inputting control signals from controller 12, a current sensor 14 for detecting current supplied from electric motor driving circuit 13 to electric motor 10 to an output detected signal to controller 12, and an ignition switch 15 for outputting ignition signal IG according to ON/OFF operation of the ignition key.

Steering torque sensor 5 detects direction and magnitude of steering torque according to screwed angle between input shaft 5A and pinion 6A, which is output as steering torque signal TS. The steering torque signal TS is the detection signal to controller 12. Speed sensor 11 outputs vehicle speed signal VP according to speeds of the transmission output shaft (not shown) sent to the to controller 12 as digital signals. Further, current sensor 14 has resistance connected in series with electric motor 10 including a direct current servomotor or hall element, and outputs motor current signal IM according to the direction and magnitude of current sent to electric motor 10. Ignition switch 15 outputs an ON/OFF signal according to ON/OFF operation of the ignition key.

Next, controller 12 and electric motor driving circuit 13 are described. Controller 12 has input/output (I/O) interface among steering torque sensor 5, vehicle speed sensor 11, current sensor 14, and ignition switch 15. Controller 12 also has an A/D converter for converting analog signal input from these sensors into digital signal, ROM (Read Only Memory) for storing various kinds of data or programs, RAM (Random Access Memory) for temporary storage of various kinds of data, etc., and a CPU (Central Processing Unit) for performing various kinds of calculation procedures, etc.

Controller 12 includes target current value set unit 12A, relay failure correction unit 12B, deviation calculation unit 12C, PID (Proportional Integral Differential) control unit 12D, PWM (Pulse Width Modulation) signal generation unit 12E, and relay failure detection unit 12F. Electric motor driving circuit 13 includes a gate driving circuit 13A and a bridge circuit 13B as shown in the software configuration of FIG. 2.

Steering torque signal TS output from steering torque sensor 5 is converted into a digital signal to be input to target current value set unit 12A of controller 12, and vehicle speed signal VP output from the vehicle speed sensor 11 is input to target current value set unit 12A. Target current value set unit 12A searches target current value signal IT to generate basic characteristic assist steering torque, that is increased with an increase of steering torque of the steering system and reduced with acceleration, in electric motor 10 from data area being steering torque signal TS and vehicle speed signal VP as address. Target current value set unit 12A outputs searched target current value signal IT to relay failure correction unit 12B.

Failure detection signal NG output from relay failure detection unit 12F and ON/OFF ignition signal IG output from ignition switch 15, other than target current value signal IT, are input to relay failure correction unit 12B. Relay failure correction unit 12B applies a decrease correction to target current value signal IT based on failure detection signal NG from relay failure detection unit 12F and outputs correction target current value signal IT' to deviation calculation unit 12C.

Correction target current value signal IT' from relay failure correction unit 12B is input to deviation calculation unit 12C. Motor current signal IM output from current sensor 14 is converted into digital signal to be input to deviation calculation unit 12C. Deviation calculation unit 12C calculates deviation of both correction target current value signal IT' and motor current signal IM, and outputs deviation signal ΔI to PID control unit 12D.

PID control unit 12D outputs driving control signal SO to control driving of electric motor 10 to PWM (pulse width modulation) signal generation unit 12E in order that deviation converges into zero by processing proportion (P), integration (I), and differential (D), etc., with deviation signal ΔI. PWM signal generation unit 12E generates PWM signal VO to PWM drive and outputs PWM signal VO to gate driving circuit 13A of electric motor driving circuit 13 as a control signal.

ON/OFF ignition signal IG output from ignition switch 15 is input to relay failure detection unit 12F and motor current signal IM output from current sensor 14 is converted into digital signal to be input to relay failure detection unit 12F. Relay failure detection unit 12F outputs ON/OFF signal to the relay circuit of the power system and the fail safe system, outputs gate signal for relay check CS to bridge circuit 13B, and detects ON failure in the relay circuit of the power system based on motor current signal IM to output failure detection signal NG to relay failure correction unit 128.

On the other hand, PWM signal VO from PWM signal generation unit 12E is input to gate driving circuit 13A in electric motor driving circuit 13 as a control signal, and a gate signal for relay check CS from relay failure detection unit 12F is input thereto. Gate driving circuit 13A switch-drives bridge circuit 13B based on PWM signal VO in all cases except where gate signal for relay check CS is input as mentioned hereinafter.

Figure 3:
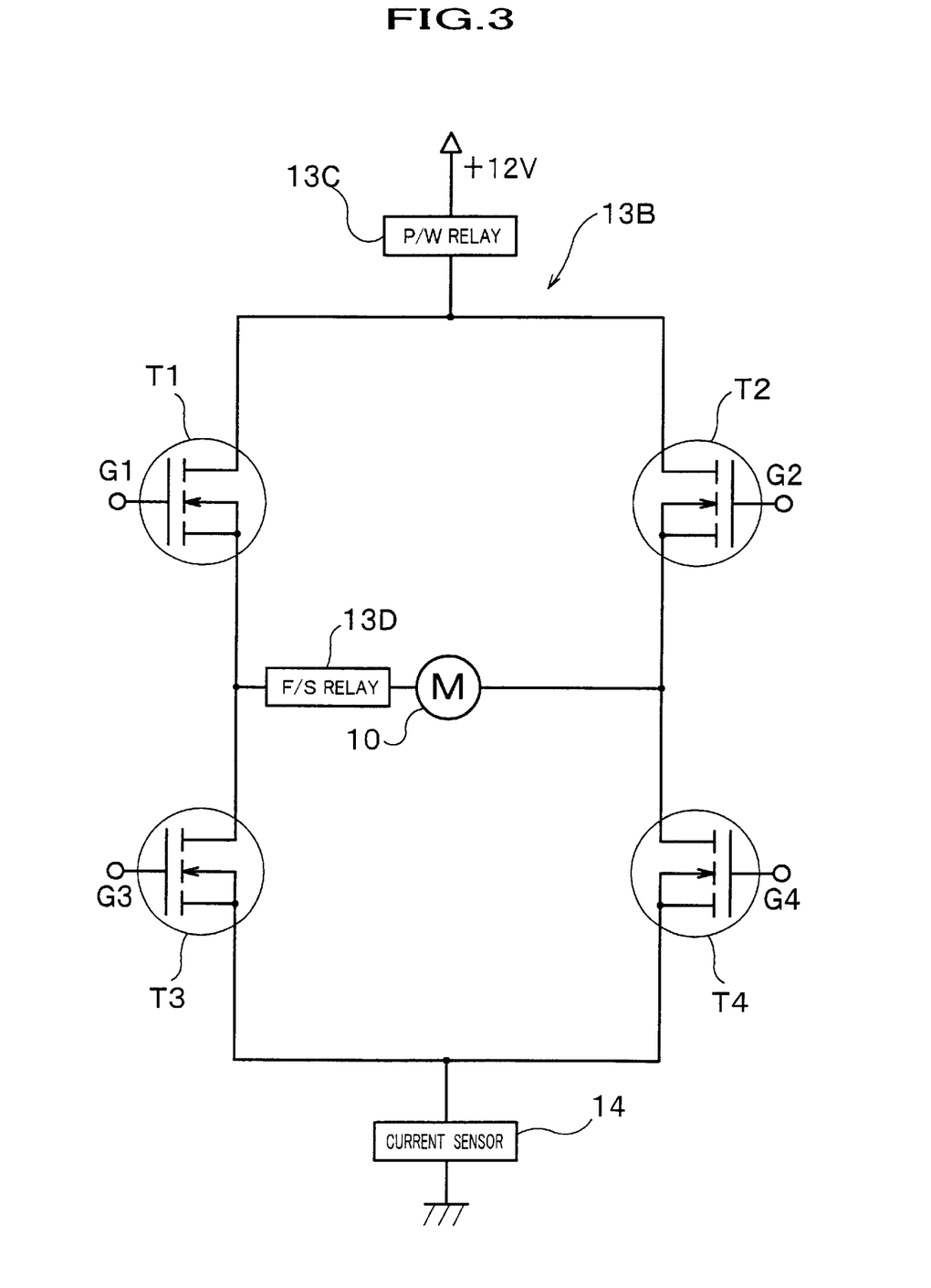
FIG. 3 is a circuit diagram of a bridge circuit in the electric power steering apparatus.

Bridge circuit 13B of electric motor driving circuit 13 includes four electric field effect transistors for configuring a bridge circuit between a power supply with direct current of 12V (battery mounted on vehicle) and the electric motor 10. The four transistors may be, for example, four power FETs (Field Effect Transistors) T1, T2, T3, T4 as shown in FIG. 3. Each power FET (T1, T2) mutually connected against the power supply is connected in series to the power supply via the relay circuit of power system 13C. Each power FET (T1, T3) mutually connected against electric motor 10 is connected in series to electric motor 10 via the relay circuit of fail safe system 13D.

Once gate driving circuit 13A inputs the gate signal for relay check CS from relay failure detecting unit 12F, it priority-outputs an ON signal to gates G1, G3 of power FETs (T1, T3) and an OFF signal to gates G2, G4 of other power FETS (T2, T4). Gate driving circuit 13A switch-drives bridge circuit 138 based on PWM signal VO from PWM signal generation unit 12E in all cases except where the gate signal for relay check CS is input. That is, gate driving circuit 13A outputs a driving signal according to the level of deviation signal ΔI to either gates G1 or G2 of power FETs (T1, T2) in accordance with the polarity of deviation signal ΔI, and outputs an OFF signal to the other (the other gate to which the signal is not output). At that time, it outputs an ON signal to either gates G3 or G4 of power EFTs (T3, T4) and an OFF signal to the other gates. For example, when the driving signal is output to gate G1 of power FET (T1), an ON signal is output to gate G4 of power FET (T4) and an OFF signal is output to gates G2, G3 of the other power FETs (T2, T3).

Figure 4:
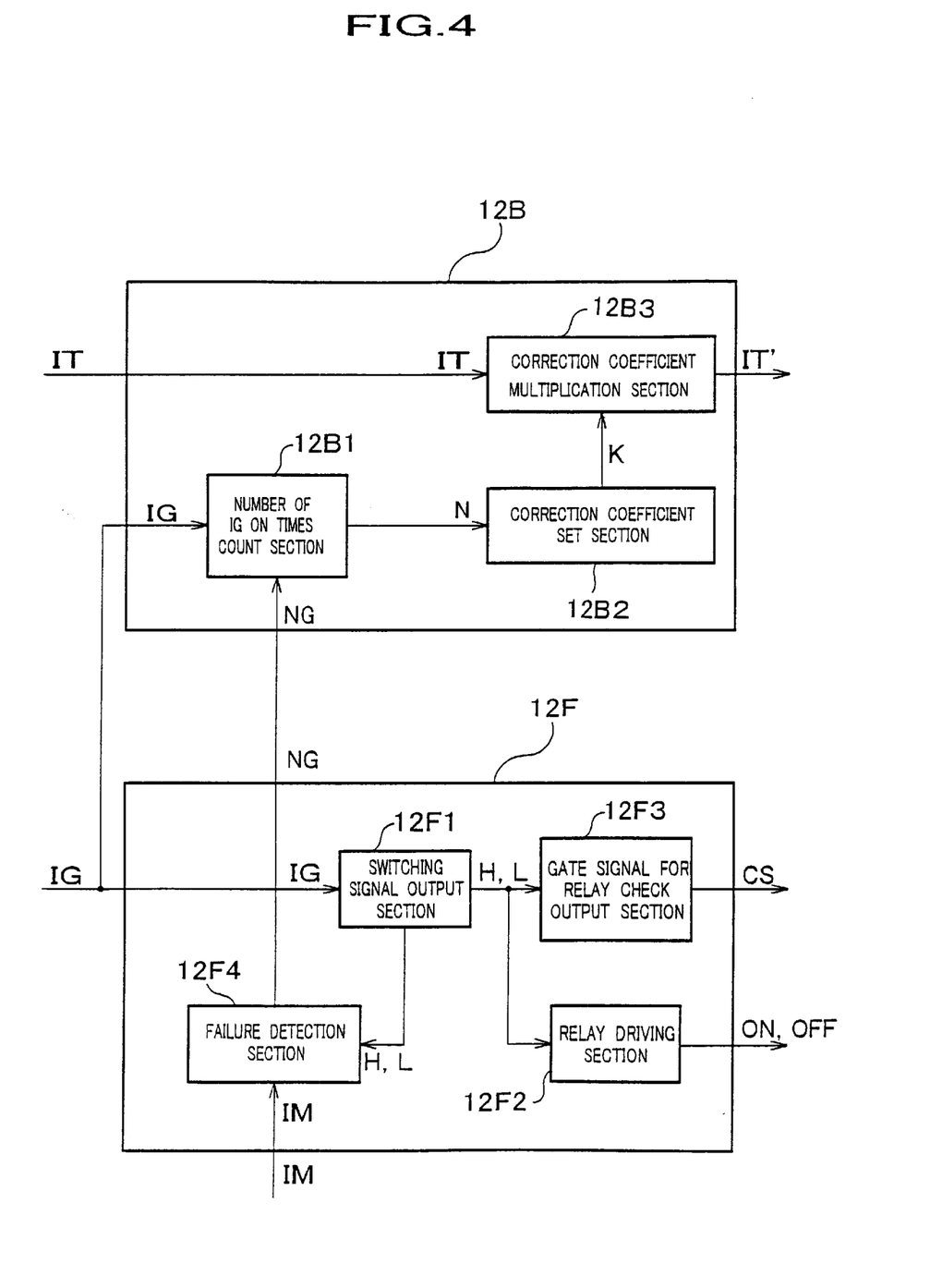
FIG. 4 is a block configuration diagram of a relay failure correction unit and a relay failure detection unit in the electric power steering apparatus.

In the electric power steering apparatus of the present invention, relay failure correction unit 12B comprises a number of IG ON times count unit 12B1, a correction coefficient set unit 12B2, and a correction coefficient multiplication unit 12B3, as shown in FIG. 4. Relay failure detection unit 12F comprises a switching signal output section 12F1, a relay driving section 12F2, a gate signal for relay check output section 12F3, and a failure detection section 12F4. The function of each unit of relay failure detection unit 12F and relay failure correction unit 12B will sequentially be described below.

Ignition signal IG from ignition switch 15 is input to switching signal output section 12F1 of relay failure detection unit 12F. Once an ON signal from ignition signal IG is input to switching signal output section 12F 1, switching signal output section 12F1 outputs H signal for a predetermined time for an initial check and then outputs L signal.

H or L signal from switching signal output section 12F1 is input to relay driving section 12F2. Relay driving section 12F2 outputs an OFF signal for relay check to the relay circuit of power system 13C (See FIG. 3) during an initial check that H signal is input. And once L signal is input to relay driving section 12F2, it stops outputting an OFF signal for relay check. Relay driving section 12F2 outputs an ON signal when each power FET (T1, T2, T3, T4) is in normal mode and an OFF signal when each power FET (T1, T2, T3, T4) fails to relay to the circuit of power system 13C and to relay to the circuit of fail safe system 13D based on a signal from the FET failure detection unit (not shown) for detecting failure of the power FET (T1, T2, T3, T4) in bridge circuit 13B.

Signal H or L from switching signal output section 12F1 is input to the gate signal for relay check output section 12F3. The gate signal for relay check output section 12F3 outputs the gate signal for relay check CS to gate driving circuit 13A (See FIG. 2) during an initial check to verify that H signal is input. Once L signal is input, the gate signal for relay check output section 12F3 stops outputting the gate signal for relay check CS.

H or L signal from switching signal output section 12F1 and motor current signal IM from current sensor 14 are input to failure detection section 12F4. Failure detection section 12F4 determines whether motor current signal IM is zero or not during the initial check that H signal is input, and assumes that the relay circuit of power system 13C is in ON failure when motor current signal IM is not zero so as to output failure detection signal NG to number of IG ON times count section 12B1 in relay failure correction unit 12B.

Failure detection signal NG and ignition signal IG are input to number of IG ON times count section 12B1 in relay failure correction unit 12B. After failure detection signal NG is input to number of IG ON times count section 12B1, number of IG ON times count section 12B1 accumulatively counts the number of times the ON signal of ignition signal IG is input. The signal of the number of accumulation input times N of ON signal of ignition signal IG that is output from number of IG ON times count section 12B1 is input to correction coefficient set section 12B2. Correction coefficient set section 12B2 stores correction coefficient K at a data area where the number of accumulation input times N is addressed and instantaneously searches correction coefficient K corresponding thereto by inputting the signal of the number of accumulation input times N. The searched signal of correction coefficient K is output to correction coefficient multiplication section 12B3. Correction coefficient K has a decimal value of less than one and when relating correction coefficient K to the number of accumulation input times N, N and K are set to, for example, (N=0, K=1.00) (N=1, K=0.70) (N=2, K=0.65) (N=3, K=0.60) (N=4, K=0.55) (N=5, K=0.50) (N=6, K=0.50) (N=7, K=0.50) . . . .

Target current value signal IT from target current value set unit 12A and correction coefficient signal K from correction coefficient set section 12B2 are input to correction coefficient multiplication section 12B3. Correction coefficient multiplication section 12B3 outputs correction target current value signal IT' which represents target current value signal IT multiplied by correction coefficient K, to decrease correct deviation calculation unit 12C.

Figure 5:
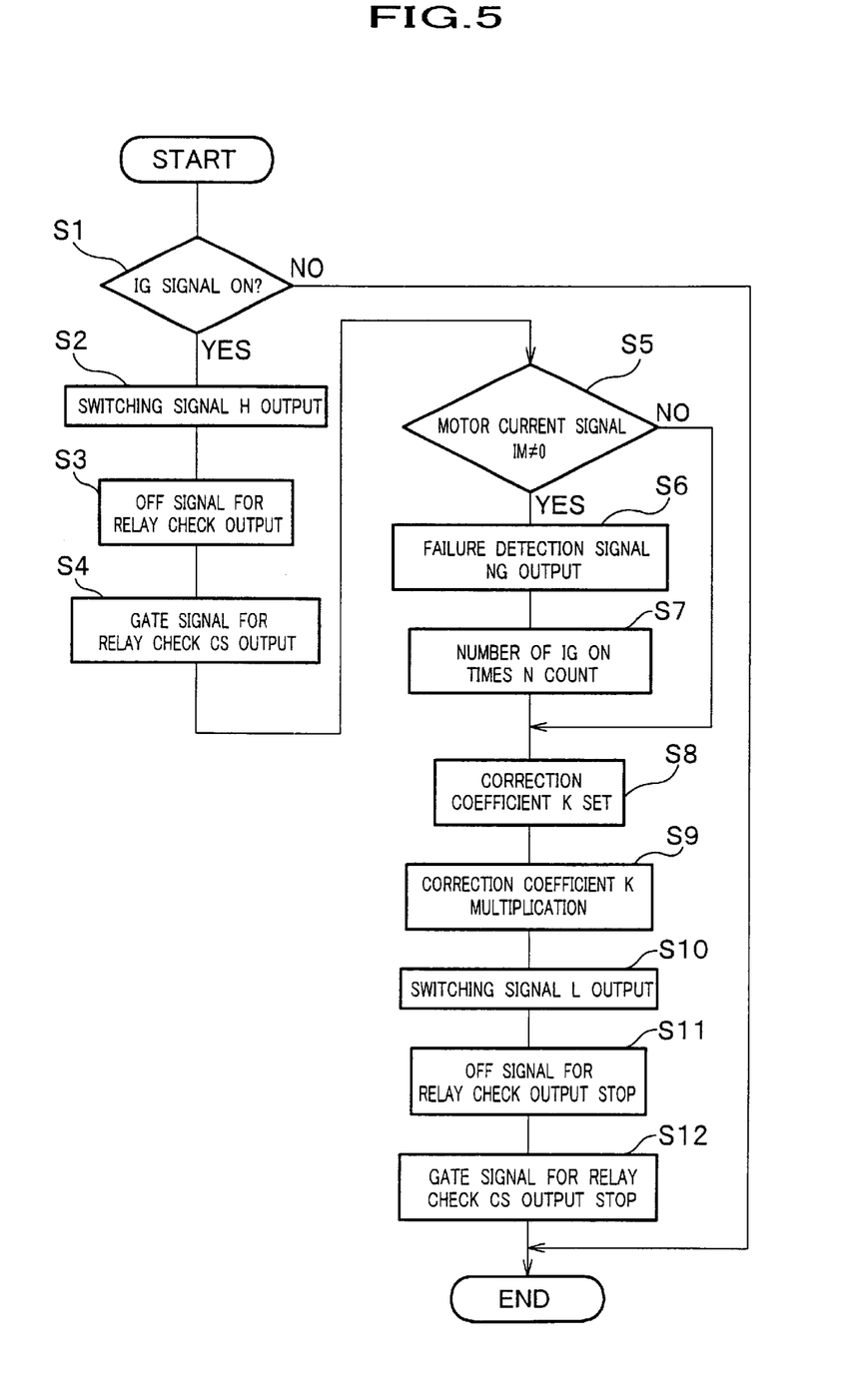
FIG. 5 is a flowchart showing data proceeding in the relay failure correction unit and the relay failure detection unit of the electric power steering apparatus.

In the electric power steering apparatus as configured in the abovementioned embodiment, once ignition switch 15 of the vehicle turns ON by ON operation of an ignition key, relay failure detection unit 12F in controller 12 (shown in FIGS. 2 and 4) checks for ON failure in the relay circuit of power system 13C as an initial check. That is, once the ON signal of ignition signal IG is input to switching signal output section 12F1 (S1) as shown in the flowchart of FIG. 5, switching signal output section 12F1 outputs H signal for only a predetermined amount of time for an initial check (S2). When an H signal is sent, relay driving section 12F2 outputs an OFF signal for relay check of the relay circuit of power system 13C (See FIG. 3) (S3) and the gate signal for relay check of the output section 12F3 outputs the gate signal for relay check CS to gate driving circuit 13A (S4).

Gate driving circuit 13A to which a gate signal for relay check CS is input connects the relay circuit of power system 13C to power supply to form a checking circuit by outputting an ON signal to gates G1, G3 of power FETs (T1, T3) in bridge circuit 13B (as shown in FIG. 3) and an OFF signal to gates G2, G4 of the other power FETs (T2, T4). Although current is not sent to current sensor 14 in cases where the relay circuit of power system 13C is in normal mode, current is sent into current sensor 14 in cases of ON failure. So, failure detection section 12F4 (shown in FIGS. 2 and 4) determines existence of ON failure in the relay circuit of power system 13C based on motor current signal IM in current sensor 14 (S5). Failure detection section 12F4 determines that the relay circuit of power system 13C is in normal mode in cases where motor current signal IM is zero and procedure proceeds to step (S8). However, failure detection section 12F4 determines that ON failure arises in the relay circuit of power system 13C in cases where motor current signal IM is not zero and it outputs failure detection signal NG to number of IG ON times count section 12B1 in relay failure correction unit 12B (S6).

When relay failure detection unit 12F does not output failure detection signal NG to number of IG ON times count section 12B1, number of IG ON times count section 12B1 outputs a signal of a number of accumulation input times N of N=0 to correction coefficient set section 12B2 and a correction coefficient K of K=1.00 to correction coefficient multiplication section 12B3. On the other hand, when relay failure detection unit 12F outputs failure detection signal NG to number of IG ON times count section 12B1, number of IG ON times count section 12B1 counts an ON signal of ignition signal IG as one (S7) and outputs a signal of number of accumulation input times N of N=1 to correction coefficient set section 12B2. Correction coefficient set section 12B2 sets correction coefficient K to 0.70 (S8) and outputs correction coefficient K to correction coefficient multiplication section 12B3.

After a predetermined amount time of initial check with inputting an ON signal of ignition signal IG has passed, switching signal output section 12F1 outputs an L signal (S10) and relay driving section 12F2 stops outputting an OFF signal for relay check (S11). Relay driving section 12F2 outputs an ON signal to the relay circuit of power system 13C and the relay circuit of fail safe system 13D is based on a signal from the FET failure detection unit (not shown) that detects failure of each power FET (T1, T2, T3, T4) in bridge circuit 13B when each power FET (T1, T2, T3, T4) is in normal mode. Relay driving section 12F2 outputs an OFF signal to the relay circuit of power system 13C and the relay circuit of fail safe system 13D when failure arises. At the time of failure, the gate signal for relay check output section 12F3 stops outputting a gate signal for relay check CS (S12) and recovers gate driving circuit 13A to a normal control state.

Steering torque sensor detects direction and magnitude of steering torque generated with operation of steering wheel 1 and outputs detected steering torque signal TS to controller 12 in steering system (shown in FIG. 1). Vehicle speed sensor 11 detects the speed of the vehicle and outputs detected vehicle speed signal VP to controller 12.

In controller 12, target current value set unit 12A (shown in FIG. 2) instantaneously searches target current value signal IT to generate basic characteristic assist steering torque, which is increased with an increase of the steering torque of the steering system and decreased with an increase of vehicle speed, by inputting steering torque signal TS and vehicle speed signal VP, and outputting target current value signal IT to relay failure correction unit 12B.

Since correction coefficient set section 12B2 (shown in FIG. 4) outputs a correction coefficient K of K=1.00 to correction coefficient multiplication section 12B3 when failure detection signal NG is not input from relay failure detection unit 12F, correction coefficient multiplication section 12B3 outputs target current value signal IT to deviation calculation unit 12C as correction target current value signal IT' as it is in relay failure correction unit 12B. Since correction coefficient set section 12B2 outputs a correction coefficient K of K=0.70 to correction coefficient multiplication section 12B3 when failure detection signal NG is input from relay failure detection unit 12F, correction coefficient multiplication section 12B3 multiplies target current value signal IT by K=0.70 to output a decreased corrected value to deviation calculation unit 12C as correction target current value signal IT'.

Then, deviation calculation unit 12C outputs deviation signal ΔI of both correction target current value signal IT' from relay failure correction unit 12B, and motor current signal IM from current sensor 14 to PID control unit 12D. PID control unit 12D outputs driving control signal SO to converge deviation into zero at the PWM signal generation unit 12E, and PWM signal generation unit 12E outputs PWM signal VO based on driving control signal SO to electric motor driving circuit 13. In the steering system shown in FIG. 1, assist steering torque based on correction target current value signal IT' is applied to rack shaft 6C of rack/pinion mechanism 6 via ball screw mechanism 9 by rotating driving electric motor 10 based on PWM signal VO, which is a control signal from controller 12. According to this configuration, steering force of steering wheel 1 is reduced.

Here, as mentioned above, relay failure correction unit 12B outputs target current value signal IT to deviation calculation unit 12C as correction IT' as it is in cases where the relay circuit of power system 13C is in normal mode in the electric power steering apparatus. In contrast, relay failure correction unit 12B outputs correction target current value signal IT' that is decrease corrected by multiplying target current value signal IT by K=0.70 to deviation calculation unit 12C in cases where ON failure arises in the relay circuit of power system 13C.

Therefore, driving of steering wheel 10 is controlled based on a lower correction target current value signal IT' at the time of failure than the correction target current value signal at the time of normal mode in cases where ON failure arises, as compared with cases where the relay circuit of power system 13C is in normal mode. As a result of this, assist steering torque applied to steering system by steering wheel 10 is decrease corrected and steering becomes possible by steering wheel 1 even for a vehicle with a large load applied to a front shaft. Furthermore, since steering torque becomes heavier than torque at the time of normal mode, it is possible to inform the vehicle driver to repair the vehicle.

After ON failure in the relay circuit of power system 13C is detected, number of IG ON times count section 12B1 of relay failure correction unit 12B counts the number of input times of the ON signal of ignition signal IG for every restart of the vehicle. Correction coefficient K, which correction coefficient set section 12B2 sets according to the number of accumulation input times N, which number of IG ON times count section 12B1 counts, is gradually decreased. That is, after ON failure in the relay circuit of power system 13C is detected, steering torque of steering wheel 1 becomes gradually heavier for every restart of the vehicle. Therefore, it is possible to inform the vehicle driver to repair the vehicle.

Figure 6:
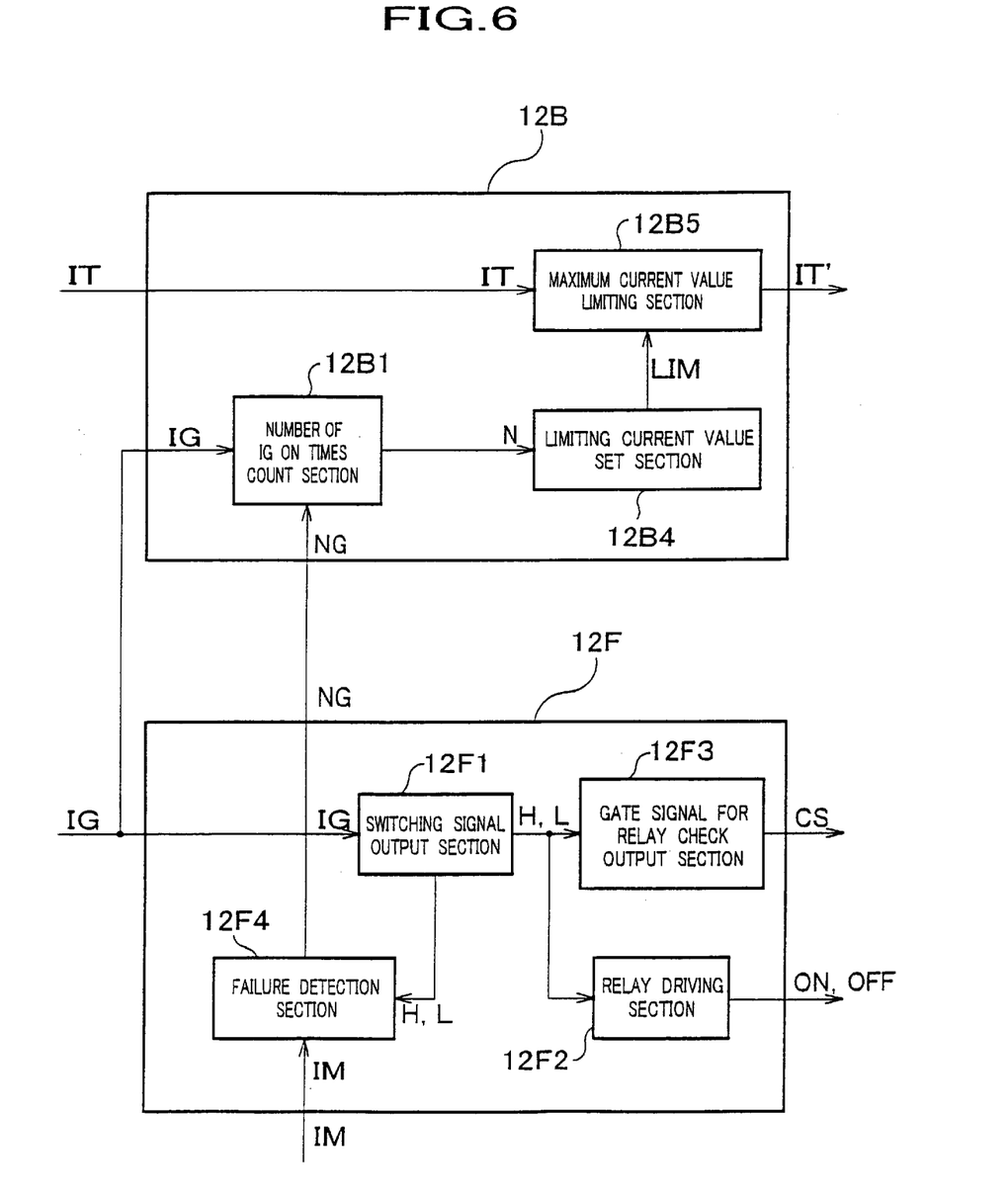
FIG. 6 is a block configuration diagram of the relay failure correction unit and relay failure detection unit in the electric power steering apparatus according to another embodiment.

Relay failure correction unit 12B may be configured as shown in FIG. 6 in the electric power steering apparatus of the present invention. That is, it may be configured by number of IG ON times count section 12B1 similar to the aforementioned number of IG ON times count section 12B1, and further configured by limiting current value set section 12B4 and maximum current value limiting section 12B5, mentioned hereinafter.

Limiting current value set section 12B4 stores limiting current value LIM in a data area where number of accumulation input times N of an ON signal of ignition signal IG, which number of IG ON times count section 12B1 outputs as a signal, is addressed. Section 12B4 instantaneously searches limiting current value LIM corresponding to an input signal by inputting a signal of number of accumulation input times N. Limiting current value set section 12B4 outputs a searched signal of limiting current value LIM to maximum current value limiting section 12B5. The maximum current value acceptable in each power FET (T1, T2, T3, T4) in bridge circuit 13B is set and limiting current value LIM is gradually decreased. The number of accumulation input times N corresponding to limiting current value LIM is set to, for example, (N=0, LIM=80A) (N=1, LIM=60A) (N=2, LIM=55%) (N=3, LIM=50%) (N=4, LIM=45%) (N=5, LIM=40%) (N=6, LIM=40%) (N=7, LIM 40%).

Maximum current value limiting section 12B5 inputs target current value signal IT from target current value set unit 12A and limiting current value LIM from limiting current value set section, compares signal IT with current value LIM, and outputs lower value to deviation calculation unit 12C as correction target current value signal IT'.

Relay failure correction unit 12B configured in this way decreases the maximum value of the assist steering torque to be applied to the steering system within a certain limit, which limit is not more than limiting current value LIM of the maximum value of target current value signal IT, which target current value set unit 12A sets in cases where ON failure arises in the relay circuit of power system 13C. Relay failure correction unit 12B gradually lowers limiting current value LIM for every restart of the vehicle to decrease the maximum value of assist steering torque gradually after ON failure arises in the relay circuit of power system 13C. As a result, the functional effect of this embodiment is similar to the electric power steering apparatus of the aforementioned.

As described above, once the ignition switch turns ON, the relay circuit turns ON according to instruction of the controller, and as a result the electric motor driving circuit and electric motor are connected to the power supply. Further, the steering torque sensor detects steering torque of the steering system with operation of the steering wheel, and the controller outputs a control signal based on the steering torque required by the electric motor driving circuit to control assist steering torque to be applied to the steering system by the electric motor. At that time, when the relay failure detection unit of the controller detects ON failure in the relay circuit, the relay failure correction unit decreases the maximum value of assist steering torque provided by the electric motor based on the failure detection signal.

Therefore, according to the electric power steering apparatus of the present invention, manual steering by the steering wheel becomes possible even for a vehicle with a large load applied to a front shaft of the vehicle when ON failure arises in the relay circuit. Further, since steering torque of the steering wheel becomes heavier than torque at the time of normal mode, it is possible to inform the vehicle driver to repair the vehicle.

In the electric power steering apparatus of the present invention, steering torque of the steering wheel becomes gradually heavier for every restart of the vehicle after ON failure arises in the relay circuit. The relay failure correction unit is configured such that the amount of decreased assist steering torque is gradually increased according to the number of accumulation input times of ON signal from the ignition switch after ON failure arises in the relay circuit, making it possible to inform the vehicle driver to repair the vehicle.

What is claimed is:

1. An electric power steering apparatus comprising:
   (1) an electric motor for applying an assist steering torque to a steering system of a vehicle;
   (2) an electric motor driving circuit for driving the electric motor;
   (3) A steering torque sensor for detecting a steering torque of the steering system;
   (4) a controller for outputting a control signal based on a detection signal of the steering torque sensor to the electric motor driving circuit to control the assist steering torque with the electric motor; and
   (5) a relay circuit, which is capable of switching ON/OFF according to instructions of the controller, which is provided between the electric motor driving circuit and a power supply, wherein the controller comprises:
       (a) a relay failure detection unit for detecting ON failure in the relay circuit; and
       (b) a relay failure correction unit for decreasing the assist steering torque, at least the maximum value of the assist steering torque, of the electric motor based on the failure detection signal of the relay failure detection unit at the time of ON failure of the relay circuit.

2. An electric power steering apparatus as set forth in claim 1, wherein the relay failure correction unit gradually increases the amount of the decreased assist steering torque to the number of accumulation input times of the ON signal of an ignition switch after ON failure arises in the relay circuit.

3. An electric power steering apparatus as set forth in claim 1, wherein the relay failure correction unit multiplies a signal value, the signal value being set with the controller, by a correction coefficient having a decimal value, which is less than one, to decrease the maximum value of the assist steering torque based on the detection signal of the steering torque sensor.

4. An electric power steering apparatus as set forth in claim 2, wherein the relay failure correction unit multiplies a signal value, the signal value being set with the controller, by a correction coefficient having a decimal value, which is less than one, to decrease the maximum value of the assist steering torque based on the detection signal of the steering torque sensor.

5. An electric power steering apparatus as set forth in claim 1, wherein the relay failure correction unit decreases the maximum value of the assist steering torque within a limit of the maximum value of a signal value which the controller sets based on the detection signal of the steering torque sensor.

6. An electric power steering apparatus as set forth in claim 2, wherein the relay failure correction unit decreases the maximum value of the assist steering torque within a limit of the maximum value of a signal value which the controller sets based on the detection signal of the steering torque sensor.

* * * * *